United States Patent
Contractor et al.

(10) Patent No.: US 8,898,177 B2
(45) Date of Patent: Nov. 25, 2014

(54) E-MAIL THREAD HIERARCHY DETECTION (75) Inventors: Danish Contractor, Haryana (IN);
Manjula Golla Hosurmath, Bangalore (IN); Sachindra Joshi, New Delhi (IN); Kenney Ng, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 12/879,454

(22) Filed: Sep. 10, 2010

(65) Prior Publication Data

US 2012/0066227 A1 Mar. 15, 2012

(51) Int. Cl.
*G06F 17/30* (2006.01)
*G06Q 10/10* (2012.01)

(52) U.S. Cl.
CPC ........ *G06Q 10/107* (2013.01); *G06F 17/30946* (2013.01)
USPC .......................................... 707/753; 707/755

(58) Field of Classification Search
CPC ..................... G06F 17/30489; G06F 17/30946
USPC ......................................... 707/692, 753, 755
See application file for complete search history.

(56) References Cited

U.S. PATENT DOCUMENTS

| | | | |
|---|---|---|---|
| 5,404,488 A | 4/1995 | Kerrigan et al. | |
| 6,510,453 B1 * | 1/2003 | Apfel et al. ................... | 709/206 |
| 6,820,081 B1 * | 11/2004 | Kawai et al. ........... | 707/999.007 |
| 7,539,871 B1 * | 5/2009 | Osborn ......................... | 713/176 |
| 7,574,409 B2 | 8/2009 | Patinkin | |
| 7,716,217 B2 * | 5/2010 | Marston et al. ............... | 707/728 |
| 7,725,475 B1 | 5/2010 | Alspector et al. | |
| 7,743,051 B1 * | 6/2010 | Kashyap et al. .............. | 707/713 |
| 8,010,466 B2 | 8/2011 | Patinkin | |
| 8,032,534 B2 * | 10/2011 | Lee et al. ...................... | 707/747 |
| 8,200,762 B2 * | 6/2012 | Staats ........................... | 709/206 |
| 8,266,430 B1 * | 9/2012 | Lumb ............................ | 713/165 |
| 8,351,678 B1 | 1/2013 | Medina, III | |

(Continued)

FOREIGN PATENT DOCUMENTS

| | | |
|---|---|---|
| WO | 2006008733 | 1/2006 |
| WO | 2008137308 | 11/2008 |

OTHER PUBLICATIONS

Giuseppe Carenini et al., "Summarizing Email Conversations with Clue Words", ACM WWW '07, 2007, pp. 91-100.*
Xiaodong Zhou, "Discovering and Summarizing Email Conversations", Thesis, Feb. 2008.*
Jen-Yuan Yeh & Aaron Harnly, "Email Thread Reassembly Using Similarity Matching", Jul. 28, 2006, CEAS 2006—Third Conference on Email and Anti-Spam, 8 pages.*

(Continued)

*Primary Examiner* — Rehana Perveen
*Assistant Examiner* — Scott A Waldron
(74) *Attorney, Agent, or Firm* — Ference & Associates LLC (57) ABSTRACT A plurality of segments in an e-mail collection by parsing content of e-mails is generated. Corresponding segment signature for each segment is created and a signature index is populated using the generated segment signatures. After receiving a query e-mail, a plurality of query segments in the query e-mail is generated using content of the query e-mail and corresponding query segment signature for each query segment is generated. A query root segment is identified and corresponding query root segment signature is generated. A set of root segment signatures of the signature index is identified and the query root segment signature is compared with each root segment signature from the signature index. A subset of the signature index is identified, using a match between the root segment signature and the query root segment signature. An e-mail thread hierarchy is built using the identified subset of the signature index.

11 Claims, 8 Drawing Sheets

(56) References Cited

U.S. PATENT DOCUMENTS

| | | |
|---|---|---|
| 8,429,178 B2 | 4/2013 | Alspector et al. |
| 2003/0105716 A1* | 6/2003 | Sutton et al. .................... 705/50 |
| 2006/0095521 A1 | 5/2006 | Patinkin |
| 2007/0255803 A1 | 11/2007 | Cherian |
| 2008/0183826 A1 | 7/2008 | Notani |
| 2008/0208992 A1 | 8/2008 | Madnani |
| 2009/0012984 A1 | 1/2009 | Ravid et al. |
| 2009/0089383 A1 | 4/2009 | Ngan |
| 2009/0319500 A1* | 12/2009 | Agrawal et al. .................... 707/4 |
| 2010/0017487 A1 | 1/2010 | Patinkin |
| 2010/0030798 A1 | 2/2010 | Kumar et al. |
| 2010/0169888 A1* | 7/2010 | Hare et al. .................... 718/102 |
| 2010/0287196 A1* | 11/2010 | Shields et al. ................ 707/769 |
| 2012/0158728 A1 | 6/2012 | Kumar et al. |
| 2012/0191716 A1 | 7/2012 | Omoigui |

OTHER PUBLICATIONS

"Encore Discovery Solutions Selects Equivio Technology for Near-Duplicate Detection and Email Thread Analysis", available at http://www.encorelegal.com/pdfs/Equivo-Technology-Press-Release.pdf, Aug. 10, 2009, Phoenix, Arizona.

Huy, Nguyen The, "Elimination of Redundant Emails", Honour Year Project Report, 2006-2007, National University of Singapore, available at http://www.comp.nus.edu.sg/~wongls/projects/redundant-mails/nguyen-report-4apr07.pdf.

Wu, Yejun, and Oard, Douglas, W., "Indexing Emails and Email Threads for Retrieval", SIGIR '05, Aug. 15-19, 2005, Salvador, Brazil, available at http://portal.acm.org/citation.cfm?id=1076180&dl=GUIDE&coll=GUIDE&CFID=64252189&CFTOKEN=34781219.

* cited by examiner

E-MAIL THREAD HIERARCHY DETECTION

BACKGROUND

Electronic mail (e-mail) is a popular tool used in communication between people and groups of people. Many a times it may be desirable to efficiently find similar e-mails located in a database or a collection of e-mails. E-mail thread conventionally refers to establishing relationship within multiple e-mails from a set of e-mails. Often, e-mails are forwarded or replied to without much edits being made to the original content of the e-mail.

BRIEF SUMMARY

Embodiments of the invention are directed to a method, a system and a computer program product for building an e-mail thread hierarchy. Accordingly, embodiments of the invention generate a plurality of segments in at least one e-mail from the e-mail collection by parsing content of e-mails, create corresponding segment signature for each segment of the plurality of segments, and populate a signature index using the generated segment signatures of the plurality of segments. Embodiments of the invention further receive a query e-mail, generate a plurality of query segments in the query e-mail by parsing the content of the query e-mail, create corresponding query segment signature for each query segment of the plurality of query segments, and identify a query root segment and corresponding query root segment signature of the query e-mail. Further embodiments of the invention receive a pre-defined token match threshold, identify a set of root segment signatures of the signature index, and compare the query root segment signature with each root segment signature of the set of root segment signatures of the signature index. Yet further embodiments of the invention identify a subset of the signature index, where a match between the root segment signature and the query root segment signature is at least the pre-defined token match threshold, and build the e-mail thread hierarchy using the identified subset of the signature index.

BRIEF DESCRIPTION OF THE DRAWINGS

Embodiments of the invention are described below, by way of example only, with reference to the following schematic drawings, where.

DETAILED DESCRIPTION

Embodiments of the invention are directed to a method, a system and a computer program product for building an e-mail thread hierarchy.

Figure 1:
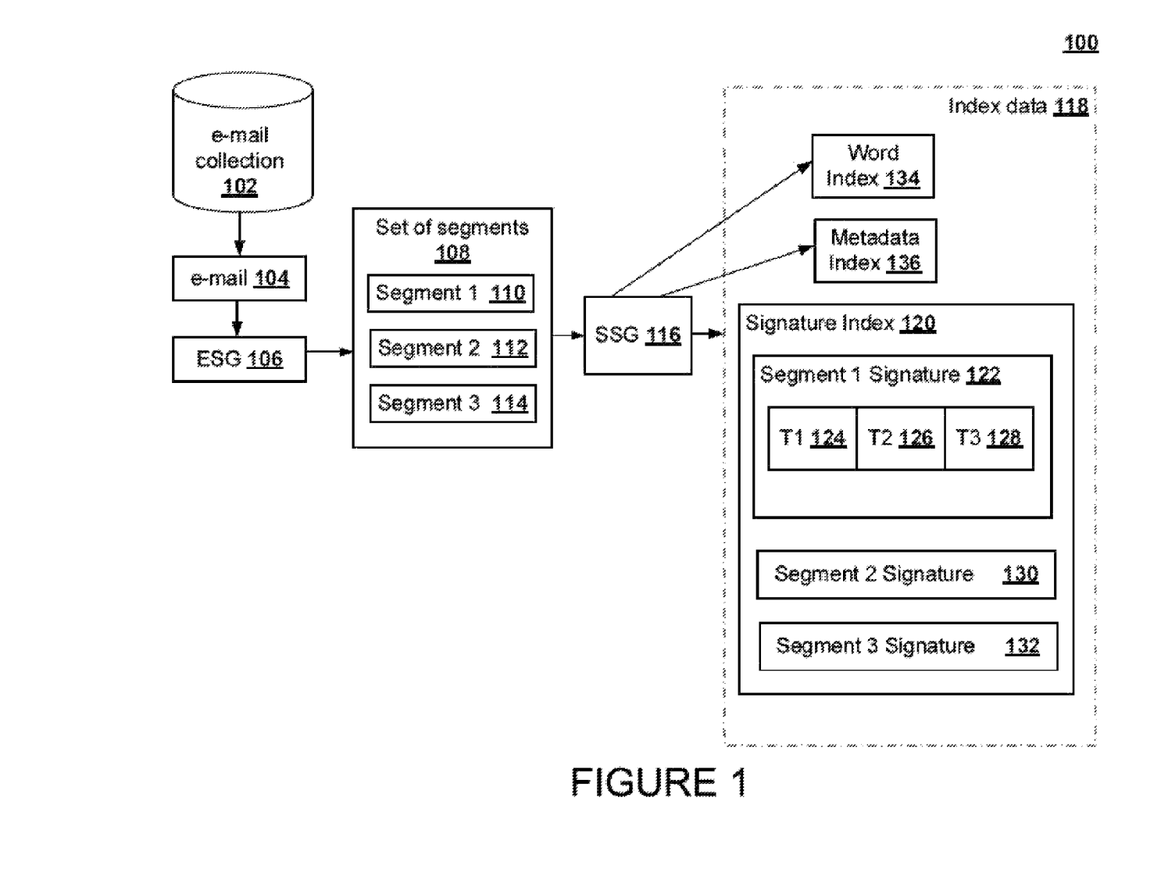
FIG. 1 depicts a schematic of index data creation as disclosed in an exemplary embodiment of the invention.

FIG. 1 depicts a schematic 100 of index data creation as disclosed in an exemplary embodiment of the invention. Schematic 100 depicts an e-mail collection 102, which has a plurality of e-mails. One exemplary e-mail is shown as element 104. Schematic 100 also includes an e-mail segment generator (ESG) 106, a segment set 108, a segment signature generator (SSG) 116, and index data block 118. Segment set 108 further includes several segments. Segments refer to contents of exactly one e-mail. E-mail 104 may include some forwarded/replied to e-mails and those individual e-mails within e-mail 104 are also termed as segments.

In an exemplary mode, three segments for e-mail 104 are shown. Those three segments are part of segment set 108, and are segment1 110, segment2 112 and segment3 114 and ESG 106 is adapted to identify each of these various segments. Once the segments are identified, SSG 116 is adapted to create corresponding segment signature for each segment. In one embodiment, SSG 116 while creating the corresponding segment signature uses near-duplicate detection approach. It should be obvious to one skilled in the art that various other approaches may be used for creating the corresponding segment signatures. SSG 116 also uses a pre-defined number of tokens and a set of pre-defined tokens. In an exemplary mode, segment1 signature 122 corresponds to segment1 110, segment2 signature 130 corresponds to segment2 112, and segment3 signature 132 corresponds to segment3 114.

In an exemplary mode, for segment1 signature, the pre-defined number of tokens is three, thus segment1 signature 122 includes three tokens T1 124, T2 126 and T3 128. The set of pre-defined tokens includes at least one of a set of words and a set of numbers. Another exemplary function of SSG 116 is to generate a word index 134 and/or a metadata index 136. Index data 118 may include, in an exemplary mode, a plurality of word index 134, metadata index 136 and signature index 120. Word index 134 may include at least one of keyword and subject information, and metadata index 136 may include at least one of temporal information and navigation information. According to one embodiment, ESG 106 and SSG 116 may reside on a single processor or separate processors. E-mail collection 102 may be a repository or a database, in one embodiment, residing on the same system having the processor or may be communicatively coupled to the processor of the system.

Figure 2:
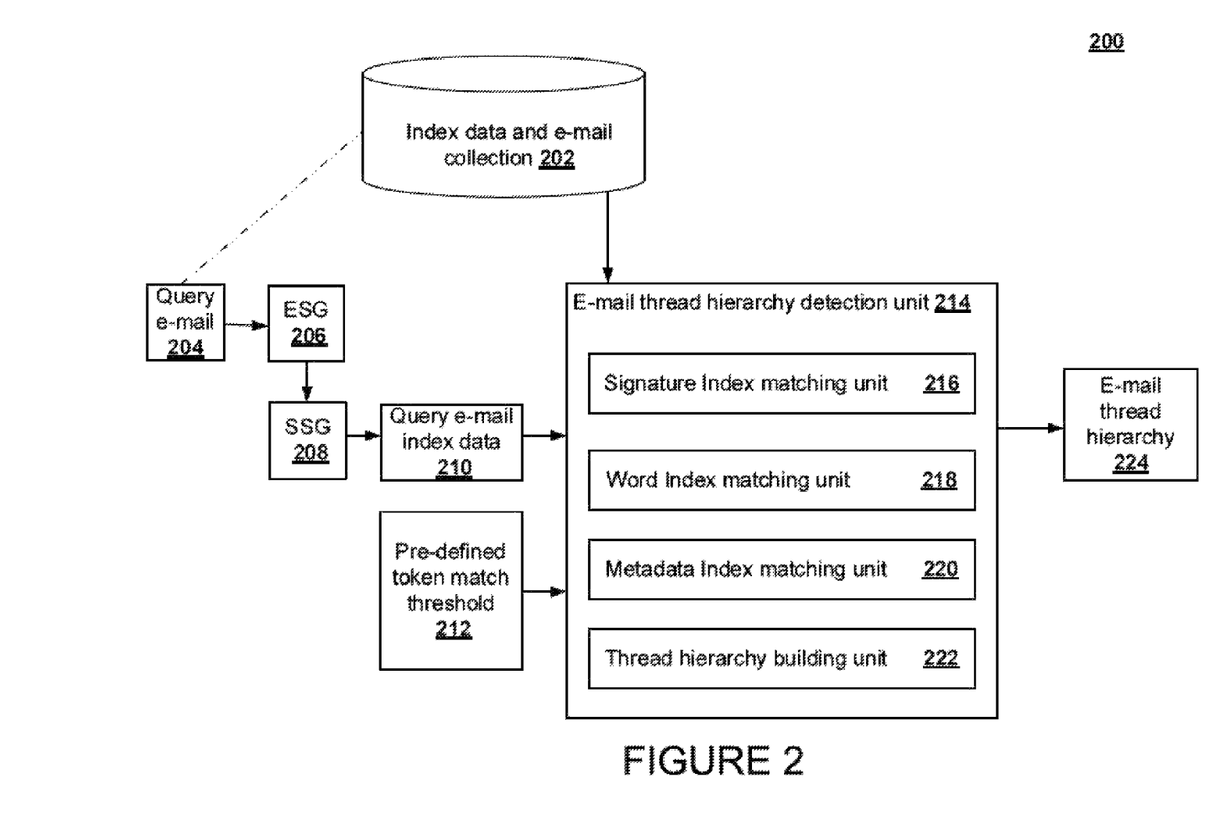
FIG. 2 depicts a schematic of building an e-mail thread hierarchy using index data created as shown in FIG. 1, as disclosed in an exemplary embodiment of the invention.

FIG. 2 depicts a schematic 200 of building an e-mail thread hierarchy using index data created as shown in FIG. 1, according to an exemplary embodiment of the invention. Schematic 200 includes a repository of index data and the e-mail collection 202. Schematic 200 also shows a query e-mail 204, an e-mail segment generator (ESG) 206, a segment signature generator (SSG) 208, a query index data 210, a pre-defined token match threshold 212, an e-mail thread hierarchy detection unit 214 and an e-mail thread hierarchy 224. In one embodiment, ESG 206 may be the same as ESG 106 of FIG. 1. In another embodiment, SSG 208 may be the same as SSG 116 of FIG. 1. ESG 206 is adapted to receive query e-mail 204 and generate a plurality of query segments in the query e-mail by parsing content of the query e-mail. Once the query segments are identified, SSG 208 is adapted to create corresponding query segment signature for each query segment of the plurality of query segments.

SSG 208, while generating the corresponding query segment signature, uses a near duplicate detection approach.

Another exemplary function of SSG 208 is to generate a query word index (not shown in the Figure) and/or a query metadata index (not shown in the Figure). Query e-mail index data 210 may include, in an exemplary mode, query word index, query metadata index and query signature index. The exemplary, query word index may include at least one of keyword and subject information, and exemplary query metadata index may include at least one of temporal information and navigation information. According to one embodiment, ESG 206 and SSG 208 may reside on a single processor or separate processors. Repository of index data and the e-mail collection 202 may be a file system or a database, in one embodiment, residing on memory of the same system having the processor or may be residing on a separate memory that is communicatively coupled to the processor of the system.

E-mail thread hierarchy detection unit 214 is adapted to receive a pre-defined token match threshold 212. In one embodiment, e-mail thread hierarchy detection unit 214 may include a signature index matching unit 216, a word index matching unit 218, a metadata index matching unit 220, and a thread hierarchy building unit 222. In one embodiment, e-mail thread hierarchy detection unit 214 may be on the same processor that includes ESG 206 and/or SSG 208. Signature index matching unit 216 is adapted to identify a query root segment and a corresponding query root segment signature of the query e-mail. Signature index matching unit 216 is further adapted to identify a set of root segment signatures of the signature index, and compare the query root segment signature with each root segment signature of the set of root segment signatures of the signature index. Signature index matching unit 216 is further adapted to identify a subset of the signature index, wherein a match between the root segment signature and the query root segment signature is at least the pre-defined token match threshold 212.

Word index matching unit 218 is adapted to identify a set of query words, compare at least one of the set of query words with contents of the word index associated with the subset of the signature index and modify the subset of the signature index in response to the comparing the set of query words with the contents of the word index.

Matadata index matching unit 220 is adapted to identify a query metadata, compare the query metadata with contents of the metadata index associated with the subset of the signature index and modify the subset of the signature index in response to the comparing the query metadata with the contents of the metadata index.

Thread hierarchy building unit 222 is adapted to build the e-mail thread hierarchy using the identified subset of the signature index. Thread hierarchy building unit 222 is further adapted to identify a first e-mail having only one segment, wherein the first e-mail is corresponding to the query root segment signature in the subset of the signature index, assign the first e-mail as a root node of the e-mail thread hierarchy 224. Thread hierarchy building unit 222, in a recursive manner, for all e-mails corresponding to the subset of the signature index, is further adapted to compare a plurality of segment signatures from the subset of the signature index using a near duplicate detection approach, determine a position of corresponding e-mail in the e-mail thread hierarchy 224, in response to the comparing a plurality of segment signatures from the subset of the signature index, update the e-mail thread hierarchy 224, and present the e-mail thread hierarchy 224.

Figure 3:
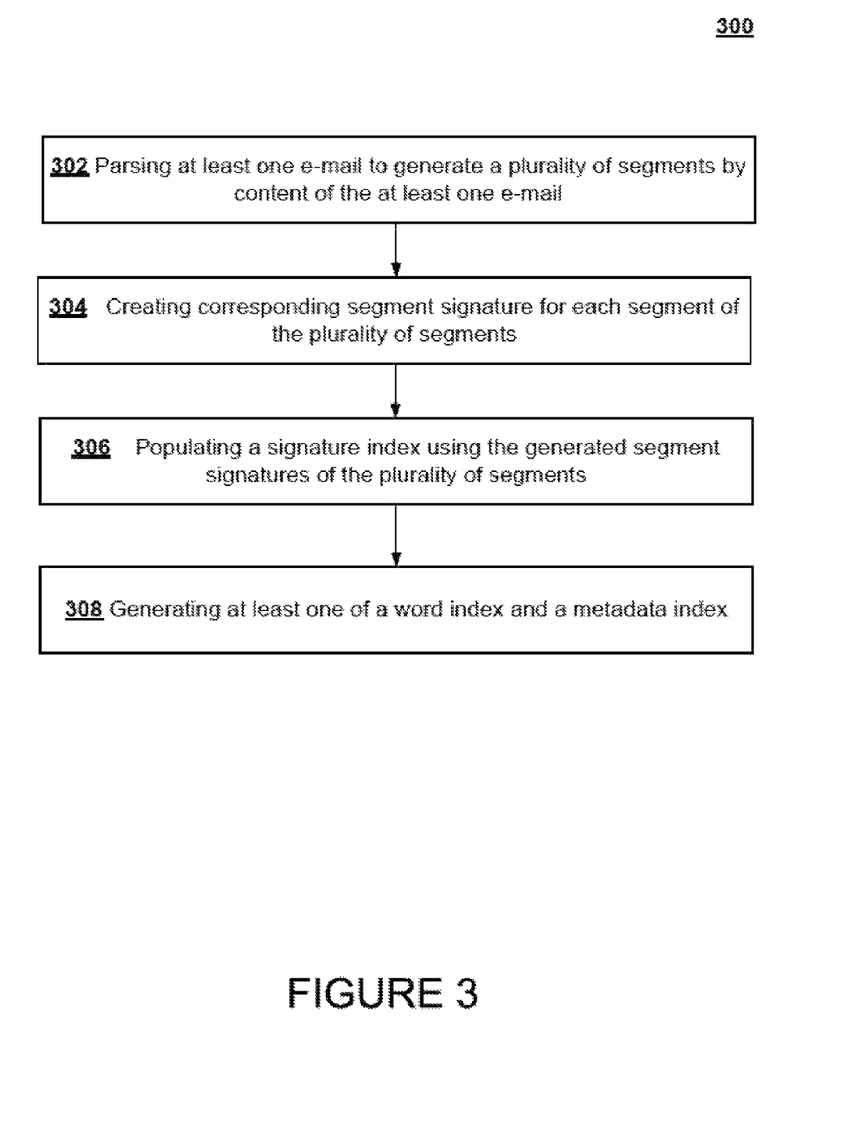
FIG. 3 shows a flow chart for creating index data as disclosed in an exemplary embodiment of the invention.

FIG. 3 shows a flow chart 300 for creating index data as disclosed in an exemplary embodiment of the invention. Step 302 depicts parsing at least one e-mail from the e-mail collection to generate a plurality of segments based on content of the at least one e-mail. Step 304 shows creating corresponding segment signature for each segment of the plurality of segments. Step 304 of generating the corresponding segment signature uses near-duplicate detection approach as well as a pre-defined number of tokens and a set of pre-defined tokens. The set of pre-defined tokens comprises at least one of a set of words and a set of numbers. Step 306 shows populating a signature index using the generated segment signatures of the plurality of segments. Step 308 depicts generating at least one of a word index and a metadata index, wherein the word index comprises at least one of keyword and subject information, and wherein the metadata index comprises at least one of temporal information and navigation information.

Figure 4A:
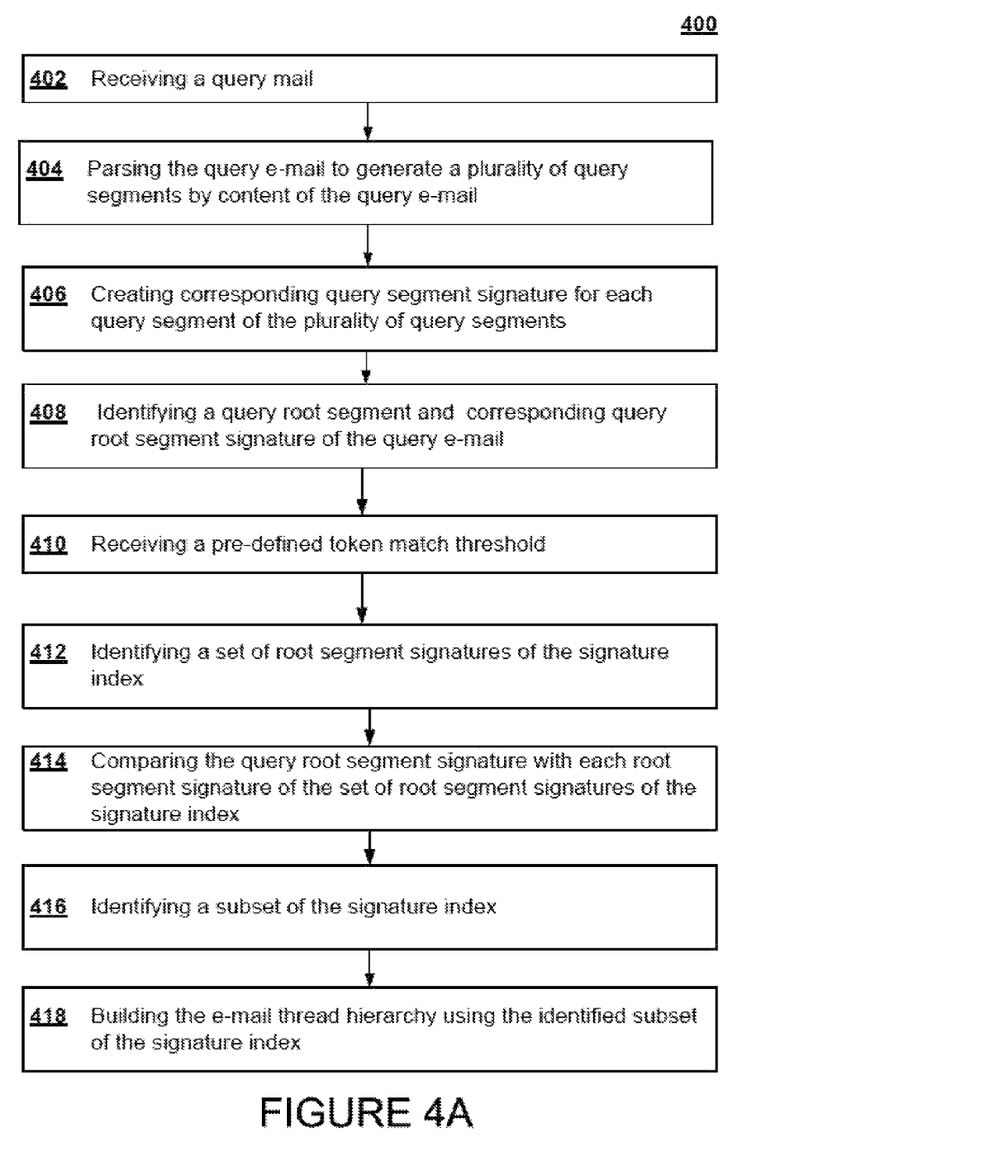
FIG. 4A shows a flow chart for overall method of building e-mail thread hierarchy using index data as disclosed in an exemplary embodiment of the invention.

FIG. 4A shows a flow chart 400 for overall method of building e-mail thread hierarchy using index data as disclosed in an exemplary embodiment of the invention. Step 402 shows receiving a query e-mail. Step 404 shows parsing the query e-mail to generate a plurality of query segments based on content of the query e-mail. Step 406 depicts creating corresponding query segment signature for each query segment of the plurality of query segments. Step 408 shows identifying a query root segment and corresponding query root segment signature of the query e-mail. Step 410 depicts receiving a pre-defined token match threshold. Step 412 shows identifying a set of root segment signatures of the signature index. Step 414 shows comparing the query root segment signature with each root segment signature of the set of root segment signatures of the signature index. Step 416 shows identifying a subset of the signature index, wherein a match between the root segment signature and the query root segment signature is at least the pre-defined token match threshold. Step 418 depicts building the e-mail thread hierarchy using the identified subset of the signature index.

Figure 4B:
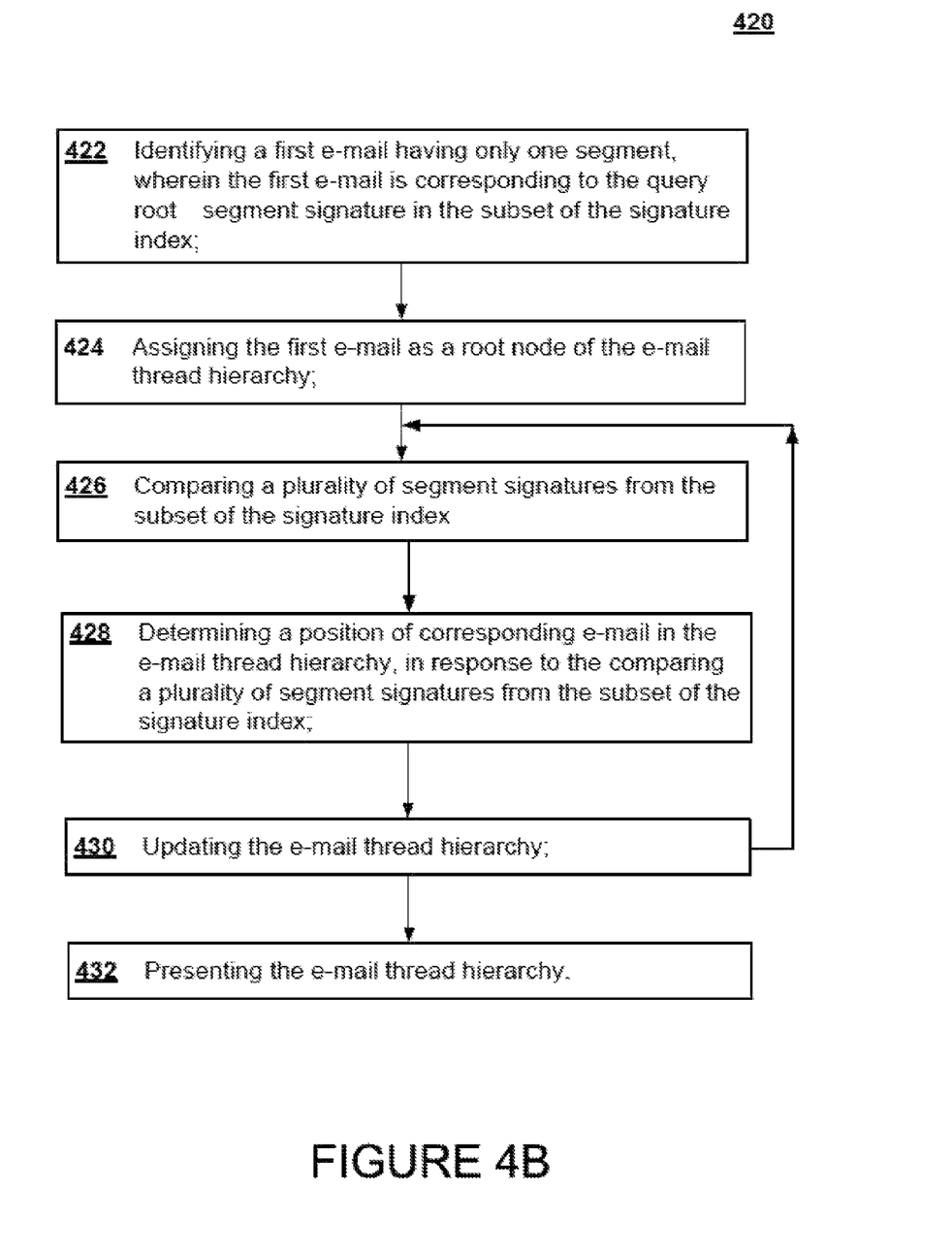
FIG. 4B shows a flow chart for details of building of e-mail thread hierarchy as disclosed in an exemplary embodiment of the invention.

FIG. 4B shows a flow chart 420 for some exemplary details of step 418 of FIG. 4A of building of e-mail thread hierarchy as disclosed in an exemplary embodiment of the invention. Step 422 depicts identifying a first e-mail having only one segment, wherein the first e-mail is corresponding to the query root segment signature in the subset of the signature index. Step 424 shows assigning the first e-mail as a root node of the e-mail thread hierarchy. Step 426, step 428 and step 430 are performed in a recursive manner until all e-mails corresponding to the identified subset of the signature index are performed. Step 426 shows comparing a plurality of segment signatures from the subset of the signature index using a near duplicate detection approach, step 428 depicts determining a position of corresponding e-mail in the e-mail thread hierarchy, in response to the comparing a plurality of segment signatures from the subset of the signature index, and step 430 shows updating the e-mail thread hierarchy. Once the e-mail hierarchy is completed using the above recursive steps, step 432 shows presenting the e-mail thread hierarchy.

Figure 4C:
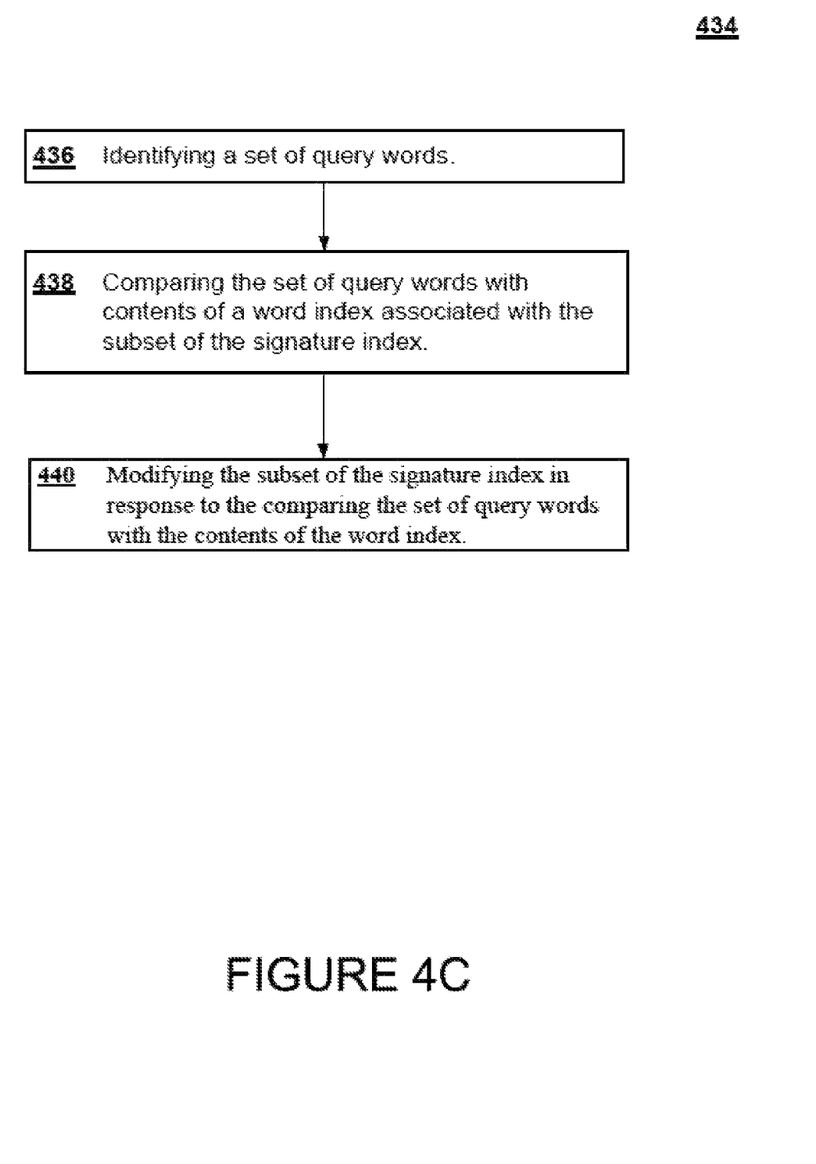
FIG. 4C shows a flow chart for using word index as disclosed in an exemplary embodiment of the invention.

FIG. 4C shows a flow chart 434 for using word index as disclosed in an exemplary embodiment of the invention. Flow chart 434, in one embodiment, may be additional details of step 416 of FIG. 4A. Step 436 shows identifying a set of query words. Step 438 shows comparing the set of query words with contents of a word index associated with the subset of the signature index. Step 440 depicts modifying the subset of the signature index in response to the comparing the set of query words with the contents of the word index.

Figure 4D:
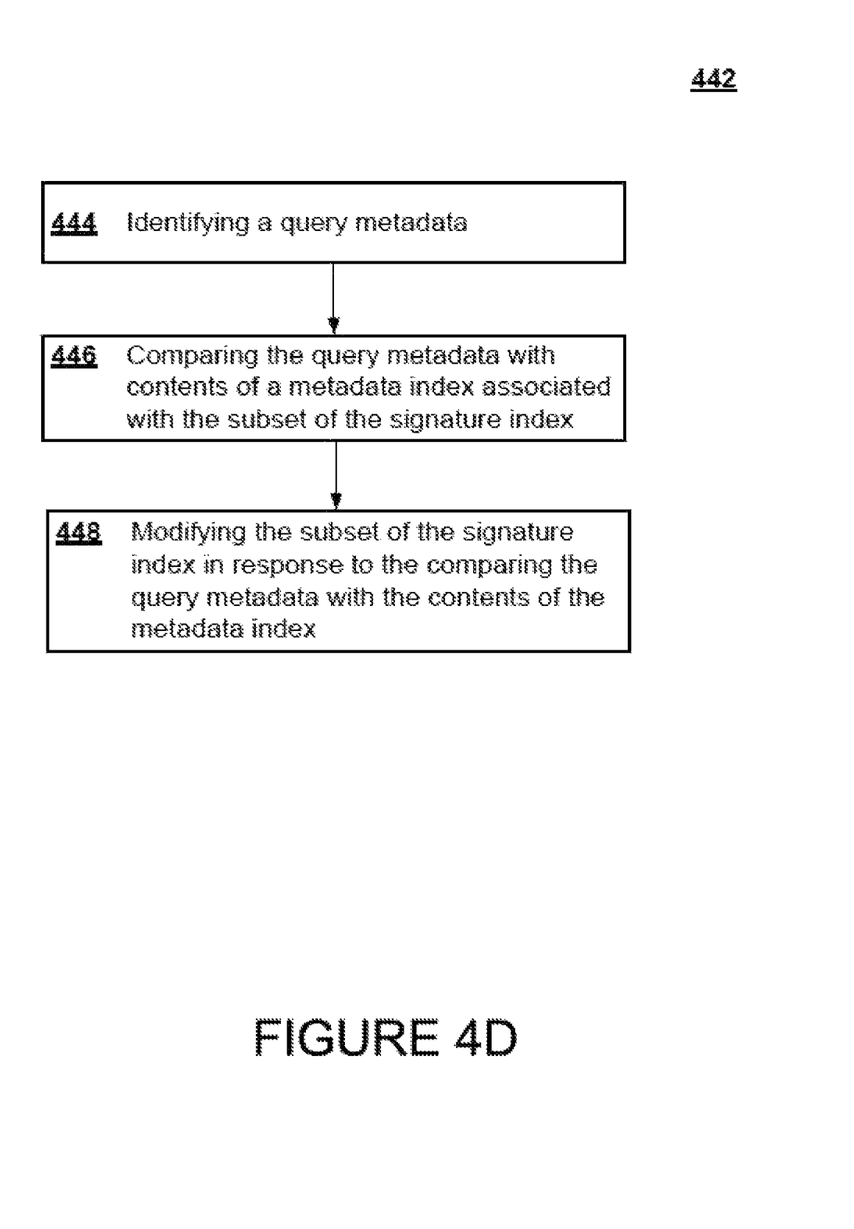
FIG. 4D depicts a flow chart for using metadata index as disclosed in an exemplary embodiment of the invention.

FIG. 4D depicts a flow chart 442 for using metadata index as disclosed in an exemplary embodiment of the invention. Flow chart 442, in one embodiment, may be additional details of step 416 of FIG. 4A. Step 444 depicts identifying a query metadata. Step 446 shows comparing the query metadata with contents of a metadata index associated with the subset of the signature index. Step 448 shows modifying the subset of the signature index in response to the comparing the query metadata with the contents of the metadata index.

Figure 5:
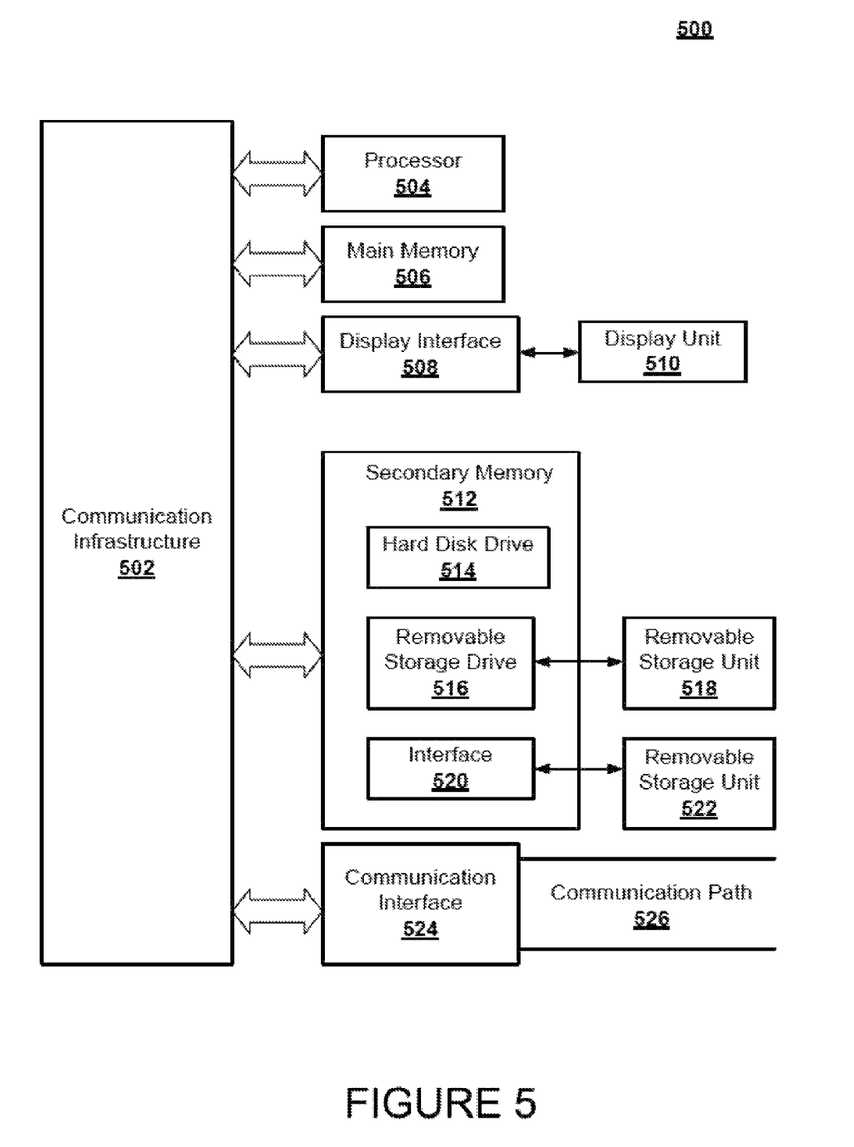
FIG. 5 shows an exemplary schematic of a computer system used for building an e-mail thread hierarchy as disclosed in any one or more of FIG. 1, FIG. 2, FIG. 3 and FIG. 4A through FIG. 4D.

In an exemplary mode, an illustration of building the e-mail thread hierarchy is given below. An exemplary e-mail collection has a total of eight e-mails: e-mail1 to e-mail 8. After using the e-mail segment generator (ESG), the following segments are identified for all the eight e-mails. e-mail1=(a,b,c); e-mail2=(a,b,c,d); e-mail3=(a,d,e); e-mail4=(a); e-mail5=(a,b); e-mail6=(x,y); e-mail7=(x,a); e-mail8=(q,r,s). In an exemplary mode, if the query e-mail is e-mail2=(a,b,c,d), and that the root is discovered as "a". Using this root segment "a" as the basis, e-mail1, e-mail2, e-mail3, e-mail4, e-mail5 are selected as the subset of signature index. In the exemplary case, a determination of similarity of "a" may be performed using near duplicate detection approach. E-mail6, e-mail7, and e-mail8 are discarded. Since the root segment is "a" of the query e-mail e-mail2 is "a", e-mail4 is identified as the root node of the e-mail thread hierarchy. Further exploring e-mails corresponding to the subset of signature index, which have multiple segments, the e-mail thread hierarchy is built. Since e-mail5=(a,b), e-mail5 becomes a second level node. E-mail1=(a,b,c) then becomes a child of e-mail5. Thus in a recursive manner, a parent-child relationship may be built to evolve an e-mail thread hierarchy. The email thread hierarchy is illustrated in one embodiment below:

FIG. 5 is a block diagram of an exemplary computer system 500 that can be used for implementing various embodiments of the present invention. In some embodiments, the computer system 500 can be used to perform the steps described in either FIG. 3 or FIG. 4 or both. In some embodiments, the computer system 500 can be used as a system described in either FIG. 1 for FIG. 2, or both. In some other embodiments, the computer system 500 can be used to perform the steps described in any of FIG. 3 or FIG. 4A through FIG. 4D. The Computer system 500 includes a processor 504. It should be understood although FIG. 5 illustrates a single processor, one skilled in the art would appreciate that more than one processor can be included as needed. The processor 504 is connected to a communication infrastructure 502 (for example, a communications bus, cross-over bar, or network) where the communication infrastructure 504 is configured to facilitate communication between various elements of the exemplary computer system 500. Various software embodiments are described in terms of this exemplary computer system. After reading this description, it will become apparent to a person of ordinary skill in the relevant art(s) how to implement the invention using other computer systems and/or computer architectures.

Exemplary computer system 500 can include a display interface 508 configured to forward graphics, text, and other data from the communication infrastructure 502 (or from a frame buffer not shown) for display on a display unit 510. The computer system 500 also includes a main memory 506, which can be random access memory (RAM), and may also include a secondary memory 512. The secondary memory 512 may include, for example, a hard disk drive 514 and/or a removable storage drive 516, representing a floppy disk drive, a magnetic tape drive, an optical disk drive, etc. The removable storage drive 516 reads from and/or writes to a removable storage unit 518 in a manner well known to those having ordinary skill in the art. The removable storage unit 518, represents, for example, a floppy disk, magnetic tape, optical disk, etc. which is read by and written to by the removable storage drive 516. As will be appreciated, the removable storage unit 518 includes a computer usable storage medium having stored therein computer software and/or data.

In exemplary embodiments, the secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to the computer system 500.

The computer system 500 may also include a communications interface 524. The communications interface 524 allows software and data to be transferred between the computer system and external devices. Examples of the communications interface 524 may include a modem, a network interface (such as an Ethernet card), a communications port, a PCM-CIA slot and card, etc. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. These propagated signals are provided to the communications interface 524 via a communications path (that is, channel) 526. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Advantages of various embodiments of the invention include higher efficiency in communication data management and higher performance. Other advantages of some of the other embodiments include better and more readily useful representation of communication network for actionable knowledge. Advantages of some other embodiments may further include more efficient clustering and classification of e-mail data. Advantages of various embodiments of the invention may further include being able to generate missing e-mails if they occur as part of history of other e-mails.

Advantages of various embodiments of the invention include less reliance on only header data, or header attributes of e-mails in the e-mail collection, although it could be used as a yet another criteria. Advantages of various embodiments of the invention also facilitate "fuzzy" matching of tokens, due to the usage of near duplicate detection approach. Various embodiments of the invention make the matching of various segments of the e-mails tolerant to extra characters, such as ">" or ">>", those may get inserted due to various e-mail clients. Although the invention explains various advantages of the specific embodiments of the invention, those skilled in the art will appreciate from the teaching of the embodiments that the advantages of the invention are not limited to the above mentioned.

The described techniques may be implemented as a method, apparatus or article of manufacture involving software, firmware, micro-code, hardware such as logic, memory and/or any combination thereof. The term "article of manufacture" as used herein refers to code or logic and memory implemented in a medium, where such medium may include hardware logic and memory [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also include transmission signals propagating through space or a transmission media, such as an optical fiber, copper wire, etc. The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may include a combination of hardware and software components in which the code is embodied, processed, and executed. Of course, those skilled in the art will recognize that many modifications may be made without departing from the scope of embodiments, and that the article of manufacture may include any information bearing medium. For example, the article of manufacture includes a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

What is claimed is:

1. A computing device implemented method for identifying an e-mail thread hierarchy in a collection of e-mails, the method comprising:
    parsing at least one e-mail from the collection of e-mails to generate a plurality of segments based on the content of the at least one e-mail;
    creating a corresponding segment signature for each of the segments of the plurality of segments;
    populating a signature index using the created segment signatures of the plurality of segments;
    said populating of a signature index comprising generating at least one of a word index and a metadata index, wherein the word index comprises at least one of a keyword and subject information, and wherein the metadata index comprises at least one of temporal information and navigation information;
    receiving a query e-mail;
    parsing the query e-mail to generate a plurality of query segments based on the content of the query e-mail;
    creating a corresponding query segment signature for each of the query segments of the plurality of query segments;
    identifying a query root segment and corresponding query root segment signature of the query e-mail;
    receiving a pre-defined token match threshold;
    identifying a set of root segment signatures of the signature index;
    comparing the query root segment signature with each root segment signature of the set of root segment signatures of the signature index;
    identifying a subset of the signature index, wherein a match between at least one of the root segment signatures and the query root segment signature is at least the pre-defined token match threshold;
    using the identified subset of the signature index to build the e-mail thread hierarchy via:
        identifying a first e-mail having only one segment, wherein the first e-mail is corresponding to the query root segment signature in the subset of the signature index;
        assigning the first e-mail as a root node of the e-mail thread hierarchy; and
        in a recursive manner, for all e-mails corresponding to the subset of the signature index:
            comparing a plurality of segment signatures from the subset of the signature index by near-duplicate detection;
            determining a position of each corresponding e-mail in the e-mail thread hierarchy, in response to the comparing the plurality of segment signatures from the subset of the signature index; and
            updating the e-mail thread hierarchy; and
    presenting the e-mail thread hierarchy.

2. The method of claim 1, wherein the step of creating the corresponding segment signature uses near-duplicate detection.

3. The method of claim 1, wherein the step of creating the corresponding segment signature includes a pre-defined number of tokens.

4. The method of claim 3, wherein the step of creating the corresponding segment signature includes a set of pre-defined tokens comprising at least one of a set of words and a set of numbers.

5. The method of claim 1, further comprising:
    identifying a set of query words;
    comparing the set of query words with contents of the word index associated with the subset of the signature index; and
    modifying the subset of the signature index in response to the comparing the set of query words with the contents of the word index.

6. The method of claim 1, further comprising:
    identifying a query metadata;
    comparing the query metadata with contents of the metadata index associated with the subset of the signature index; and
    modifying the subset of the signature index in response to the comparing the query metadata with the contents of the metadata index.

7. A system for identifying an e-mail thread hierarchy in an e-mail collection, the system comprising at least one processor and at least one memory, wherein the processor is adapted to:
    parse at least one e-mail from the collection of e-mails to generate a plurality of segments based on the content of the at least one e-mail;
    create a corresponding segment signature for each of the segments of the plurality of segments;
    populate a signature index using the created segment signatures of the plurality of segments;
    wherein to populate a signature index comprises generating at least one of a word index and a metadata index, wherein the word index comprises at least one of a keyword and subject information, and wherein the metadata index comprises at least one of temporal information and navigation information;
    receiving a query e-mail;
    parsing the query e-mail to generate a plurality of query segments based on the content of the query e-mail;
    creating a corresponding query segment signature for each of the query segments of the plurality of query segments;
    identifying a query root segment and corresponding query root segment signature of the query e-mail;
    receive a pre-defined token match threshold;
    identify a set of root segment signatures of the signature index;
    compare the query root segment signature with each root segment signature of the set of root segment signatures of the signature index;
    identify a subset of the signature index, wherein a match between at least one of the root segment signatures and the query root segment signature is at least the pre-defined token match threshold;
    use the identified subset of the signature index to build the e-mail thread hierarchy via:
        identifying a first e-mail having only one segment, wherein the first e-mail is corresponding to the query root segment signature in the subset of the signature index;

assigning the first e-mail as a root node of the e-mail thread hierarchy; and in a recursive manner, for all e-mails corresponding to the subset of the signature index:

comparing a plurality of segment signatures from the subset of the signature index by near-duplicate detection;

determining a position of each corresponding e-mail in the e-mail thread hierarchy, in response to the comparing the plurality of segment signatures from the subset of the signature index; and updating the e-mail thread hierarchy; and present the e-mail thread hierarchy.

8. The system of claim 7, wherein the creation of the corresponding segment signatures uses near-duplicate detection and uses a pre-defined number of tokens and a set of pre-defined tokens.

9. A computer program product for detecting an e-mail thread hierarchy in an e-mail collection, the computer program product comprising:

a non-transitory computer readable storage medium having computer readable program code embodied therewith, the computer readable program code comprising computer readable program code configured to:

parse at least one e-mail from the collection of e-mails to generate a plurality of segments based on the content of the at least one e-mail;

create a corresponding segment signature for each of the segments of the plurality of segments;

populate a signature index using the created segment signatures of the plurality of segments;

wherein to populate a signature index comprises generating at least one of a word index and a metadata index, wherein the word index comprises at least one of a keyword and subject information, and wherein the metadata index comprises at least one of temporal information and navigation information;

receiving a query e-mail;

parsing the query e-mail to generate a plurality of query segments based on the content of the query e-mail;

creating a corresponding query segment signature for each of the query segments of the plurality of query segments;

identifying a query root segment and corresponding query root segment signature of the query e-mail;

receive a pre-defined token match threshold;

identify a set of root segment signatures of the signature index;

compare the query root segment signature with each root segment signature of the set of root segment signatures of the signature index;

identify a subset of the signature index, wherein a match between at least one of the root segment signatures and the query root segment signature is at least the pre-defined token match threshold;

use the identified subset of the signature index to build the e-mail thread hierarchy via:

identifying a first e-mail having only one segment, wherein the first e-mail is corresponding to the query root segment signature in the subset of the signature index;

assigning the first e-mail as a root node of the e-mail thread hierarchy; and in a recursive manner, for all e-mails corresponding to the subset of the signature index:

comparing a plurality of segment signatures from the subset of the signature index by near-duplicate detection;

determining a position of each corresponding e-mail in the e-mail thread hierarchy, in response to the comparing the plurality of segment signatures from the subset of the signature index; and updating the e-mail thread hierarchy; and present the e-mail thread hierarchy.

10. The computer program product of claim 9, wherein the creation of the corresponding segment signatures uses near-duplicate detection and uses a pre-defined number of tokens and a set of pre-defined tokens.

11. The computer program product of claim 9, further configured to:

identify at least one of a set of query words and a query metadata;

compare at least one of the set of query words with contents of the word index associated with the subset of the signature index and the query metadata with contents of the metadata index associated with the subset of the signature index; and modify the subset of the signature index in response to at least one of the comparing the set of query words with the contents of the word index and the comparing the query metadata with the contents of the metadata index.

* * * * *